United States Patent [19]

Johansson et al.

[11] 4,398,080

[45] Aug. 9, 1983

[54] ARC WELDING POWER SOURCE

[75] Inventors: Jan G. Johansson; Christian J. Henningsen; Arvo Köster, all of Laxå, Sweden

[73] Assignee: ESAB Aktiebolag, Sweden

[21] Appl. No.: 311,868

[22] Filed: Oct. 15, 1981

[30] Foreign Application Priority Data

Oct. 24, 1980 [SE] Sweden .............................. 8007479

[51] Int. Cl.³ .............................................. B23K 9/10
[52] U.S. Cl. .................................................. 219/130.1
[58] Field of Search ............. 219/130.1, 130.4, 130.51, 219/130.5; 5/451

[56] References Cited

U.S. PATENT DOCUMENTS 3,308,265 3/1967 Hobart .............................. 219/130.5
3,911,243 10/1975 Moriyama et al. .............. 219/130.1

FOREIGN PATENT DOCUMENTS 51-37854 3/1976 Japan ................................ 219/130.1
55-133877 10/1980 Japan .
1209913 10/1970 United Kingdom .

Primary Examiner—C. C. Shaw
Attorney, Agent, or Firm—Lerner, David, Littenberg, Krumholz & Mentlik

[57] ABSTRACT

A welding rectifier is connected to an a.c. power supply. The rectifier delivers a pulsating voltage which during a part of a period is too low to maintain the arc established between a welding electrode and a work. A main winding of an ironcored inductor is connected in series with the rectifier, the welding electrode and the work. An auxiliary winding is wound onto the iron core and connected in series with a capacitor. The auxiliary winding is connected to the main winding so that the two windings, when passed by a current, supply ampere-turns in the same direction. The auxiliary winding and the capacitor are connected in parallel with the main winding and the arc. The capacitor is also connected in series with a charging rectifier connected to the a.c. supply. The capacitor is discharged through the auxiliary winding and the main winding into the arc, when the voltage delivered by the welding rectifier is too low to maintain the arc.

8 Claims, 9 Drawing Figures

ARC WELDING POWER SOURCE

TECHNICAL FIELD OF THE INVENTION

This invention relates to an arc welding apparatus for direct current arc welding supplied from an alternating current supply. If the current demand of the apparatus is heavy it is advantageous to connect the apparatus to a three-phase source. However, in situations in which the demand is relatively light a single-phase unit will be satisfactory because of its lower price and lower weight.

The pulsating output voltage of a single-phase rectifier drops periodically to zero level. As a result of this drop the arc is periodically extinguished. The welding operation is unstable and the quality of the weld is affected by the instability of the arc.

A similar instability occurs when the d.c. output voltage of a three-phase rectifier that is provided with controlled rectifier elements, so-called thyristors, is adjusted by delaying the firing of the thyristors in such a way that during periodically recurring intervals the output voltage is zero or too low to maintain the arc.

The arc between the welding electrode and the work is extinguished as soon as the voltage drops below a value which is mainly determined by the material of the electrode and the work and the length of the arc.

BACKGROUND ART

In order to obviate such difficulty it has been proposed to provide covered electrodes with arc-stabilizing additives in the coating. These additives maintain during the currentless intervals an ionized atmosphere between the electrode and the work which facilitates the reignition of the arc and stabilizes the welding operation. Wire electrodes used in gas-shielded arc welding are normally not provided with such additives. Therefore other measures have to be adopted to ensure a troublefree welding.

It has been proposed to decrease the pulsation of the output d.c. voltage by providing a smoothing circuit. For example such a circuit for a single-phase power source is described in the British Pat. No. 1,284,636. The smoothing circuit is provided with an inductor, a capacitor and a diode, and connected across the output of the rectifier. The inductor and the capacitor are arranged to store electric energy when the output d.c. voltage of the welding rectifier is high and to discharge this energy into the arc when the output voltage is too low to maintain the arc.

DISCLOSURE OF THE INVENTION

It is an object of this invention to improve the operation of an arc welding apparatus of the above described type.

It is a further object of this invention to improve the interaction between the welding current supplied from the welding rectifier and the discharge current from the smoothing circuit.

A further object of this invention is to improve the operation of the welding apparatus, particularly when used for dip-transfer welding, by reducing the splatter losses.

Other objects and advantages of the invention will be apparent from the following description of an embodiment of the invention with reference to the accompanying drawings.

DESCRIPTION OF A PREFERRED EMBODIMENT

Figure 1:
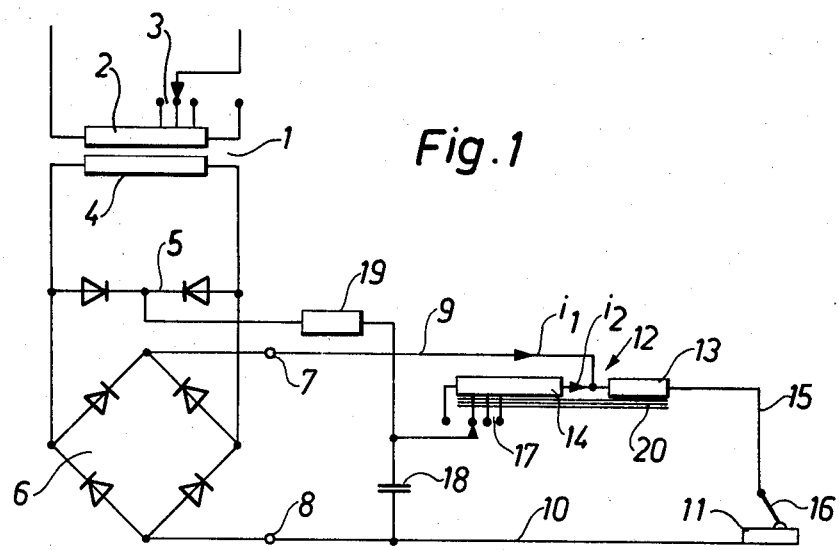
FIG. 1 is a circuit diagram of a welding power source

A transformer 1 is connected with its primary 2 to a single-phase a.c. supply. The primary is provided with taps 3 for the connection of a desired number of winding turns so as to set a suitable secondary voltage on the secondary 4. A full-wave rectifier 5 and a bridge-connected rectifier 6 are connected to the outputs of the secondary. Two conductors 9, 10 are connected to the d.c. terminals 7, 8 of the rectifier 6. The conductor 10 connects the terminal 8 of the rectifier to a work 11. The conductor 9 is connected to the junction of a main winding 13 and an auxiliary winding 14 of a welding inductor 12 which is provided with an iron core 20. A conductor 15 connects the main winding 13 to a welding electrode 16. The auxiliary winding has several taps 17. To one of them is connected the rectifier 5 and a capacitor 18 which, moreover, is joined with the terminal 8. The number of the interconnected winding turns of the auxiliary winding 14 is preferably greater than that of the main winding 13. A turn ratio between the auxiliary winding and the main winding amounting to 1.5 to 5 has proved to be particularly suitable.

Figure 2A:
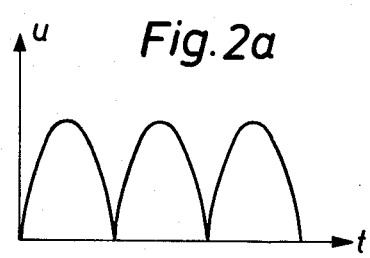
FIGS. 2a–2d show some voltage and current curves
Figure 2B:
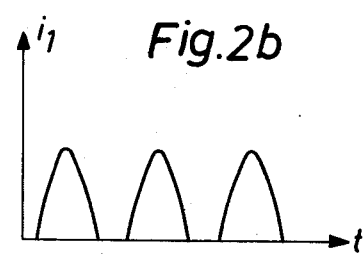

In a welding process without short circuits between the electrode and the work, which is practically comparable to a resistive load, the voltage across the terminals 7, 8 is represented by a curve as shown in FIG. 2a, and the current $i_1$ delivered by the rectifier 6 and flowing through the conductor 9 by a curve as shown in FIG. 2b. A charging current flows through the rectifier 5 to the capacitor 18. If the instantaneous value of the voltage between the terminals 7, 8 and thus also at the output of the rectifier 5 drops, the charging is interrupted and the capacitor is discharged through the welding inductor 12 to the arc between the electrode 16 and the work 11. The whole discharge current must pass the welding inductor as its flow through the rectifier is blocked.

Figure 3:
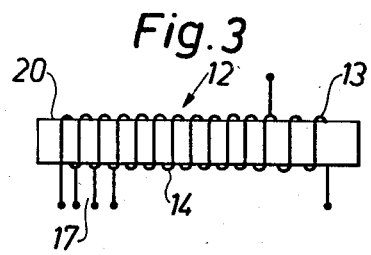
FIG. 3 shows, somewhat schematically, an welding inductor.

The inductor 12 is provided with an I-core 20 (FIG. 3). The main winding 13 and the auxiliary winding are wound onto the core so that both windings supply ampere-turns in the same direction when the discharge current flows through them. The main winding and the auxiliary winding are mounted on the core beside one another, so as to achieve a loose magnetic coupling between them. The I-core contributes also to a loose magnetic coupling as its magnetic flux closes through the air.

Figure 2C:
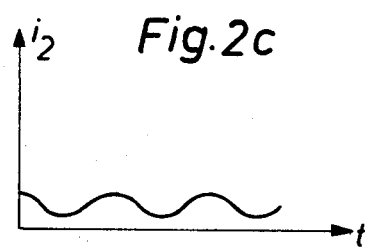
Figure 2D:
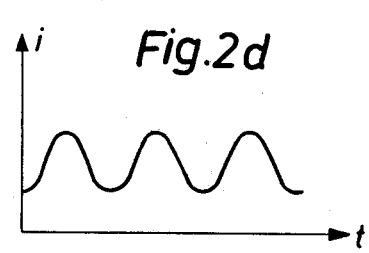

As the e.m.f. of the inductor endeavours to maintain the welding current $i$ (FIG. 2d), which is the sum of the current $i_1$ delivered from the rectifier and the current $i_2$ which substantially is the discharge current of the capacitor, the current $i_2$ will increase when the current $i_1$ decreases and vice versa. During the intervals where the current $i_1$ is zero the arc is wholly maintained by the current $i_2$. (FIG. 2c). Apart from the welding load the magnitude of the current $i_2$ is mainly influenced by the ratio of turns between the main winding and the auxiliary winding, by the magnetic coupling between the two windings and by the capacitance of the capacitor.

Owing to the arrangement of the main winding and auxiliary winding on the same iron core, the interaction between the welding current i and the discharge current $i_2$ results in a very quick response to variations in the welding current and in a remarkable smoothing effect on the arc voltage.

The response and the welding properties can be influenced by connecting the capacitor 18 and the charging rectifier 5 to different taps of the auxiliary winding. The selection of the taps is suitably made by trial. It may be advantageous of practical reasons to connect the capacitor 18 and the rectifier 5 to the same tap as shown.

It is appropriate, but not absolutely necessary, to provide the charging current circuit of the capacitor 18 with a current limiting resistor 19, which protects the diodes of the charging rectifier 5 from excessively high charging currents. The charging of the capacitor will be slightly delayed by the interconnection of a resistor. However, the influence of this resistor on the welding properties can be made practically negligible by an appropriate dimensioning of resistor, capacitor and rectifier elements.

In dip transfer welding short-circuits between the electrode and the workpiece are very numerous owing to the transfer of droplets of material from the electrode to the workpiece. The greater the short-circuit current, the greater will be the force which flings the droplets separated from the electrode against the melted pool of the weld, and the greater will be the spatter losses which are caused by the impact of the droplets on the pool.

It has been found that a loose magnetic coupling between the windings gives much lower spatter losses compared to a firm magnetic coupling. The reason for this is that as a result of the loose magnetic coupling the increase of the current $i_2$ caused by the increase of the welding current during a short circuit, is not as great as in the case of a firm coupling, and therefore the total short circuit, wherein $i_2$ enters, is limited.

Figure 4:
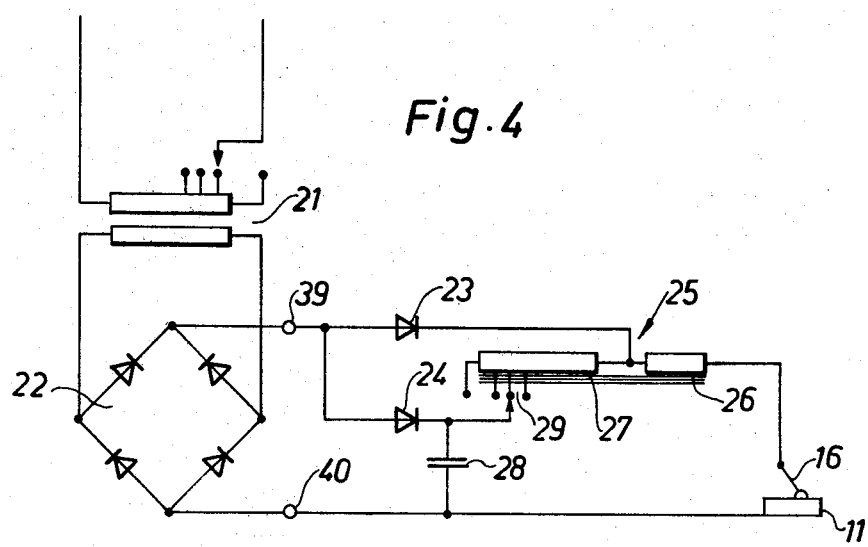
FIGS. 4, 5 and 6 are different modifications of the circuit diagram of FIG. 1.

The circuit diagram shown in FIG. 4 is somewhat simplified compared to the circuit in FIG. 1. A rectifier bridge 22 is connected to the secondary of a single-phase transformer 21. Two diodes 23, 24 are connected to one of the d.c. terminals 39, 40 of the rectifier. The bulk of the welding current flows through the diode 23 and a main winding 26 of a welding inductor 25 of the same kind as the inductor 12. The charging current for a capacitor 28 and moreover a small portion of the welding current flows through the diode 24. The capacitor 28 and the diode 24 are connected to one of the taps 29 of an auxiliary winding 27 wound onto the core of the welding inductor 25 and joined with the main winding 26. The diodes 23, 24 protect the auxiliary winding 27 from being short-circuited during the discharge of the capacitor.

The mode of the operation is the same as described above in connection with FIG. 1. The charging circuit constituted by the diode 24 and the capacitor 28 are connected across the terminals 39, 40 of the rectifier and through the rectifier to the single-phase alternating current.

Figure 5:
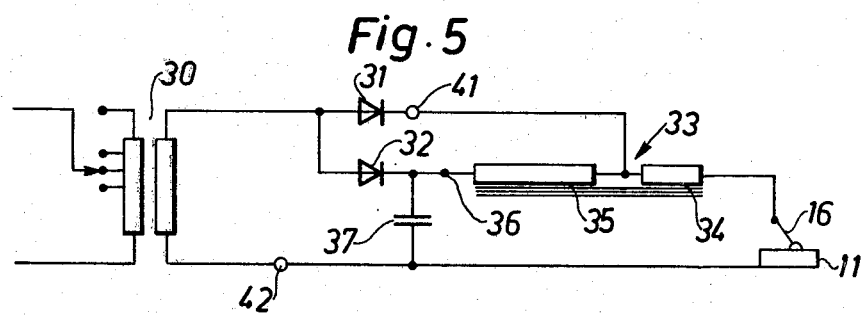

In FIG. 5 a still more simplified circuit diagram is shown. Two diodes 31, 32 are connected to the secondary of a single-phase transformer 30. The diode 31, which acts as a half-wave rectifier of the a.c. voltage, conducts the bulk of the welding current. The diode 32 constitutes with a capacitor 37 a charging curcuit connected across the secondary of the transformer 30. A welding inductor 33 of the same kind as the inductor 12 with a main winding 34 and an auxiliary winding 35 is of a simpler type than the corresponding inductors 12, 25 in FIG. 1 and FIG. 4, since the auxiliary winding only has a single output 36 connected to the diode 32 and the capacitor 37, respectively. It is true that the lack of taps on the auxiliary winding gives no setting facilities, but the costs of manufacture are reduced which may compensate for the disadvantages associated therewith.

Half-wave rectification means that the capacitance of the capacitor 37 has to be comparatively high so that the discharge current is capable to maintain the arc during the half-period when the rectified voltage is zero.

Figure 6:
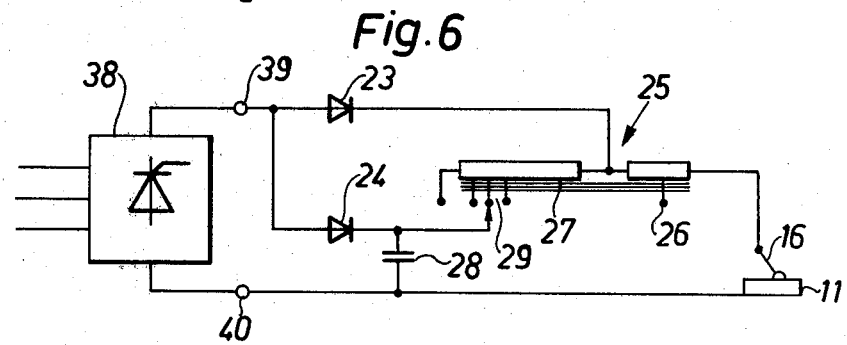

In FIG. 6 a welding rectifier 38 is connected to a three-phase supply. The welding rectifier is provided with thyristors arranged to be fired by a firing circuit (not shown). Rectifiers of this kind are well known. When low welding voltages are to be achieved the thyristors may be fired so late during the period of the alternating voltage that the d.c. output voltage becomes very low or zero during periodically recurring dead-time intervals. To prevent the extinction of the arc such a rectifier may be provided with a coupling identical with that described in connection with FIG. 4, and therefore the same reference symbols have been used in FIG. 6.

What we claim is:

1. Arc welding power supply comprising:
   a welding rectifier means connected to an alternating current supply and provided with two direct current terminals,
   a welding electrode,
   a work,
   a welding inductor provided with an iron core, a main winding and an auxiliary winding, means for connecting in series said welding electrode, said work, said terminals and said main winding,
   a smoothing circuit comprising a capacitor means in series with a smoothing inductor, the winding of said smoothing inductor comprising the auxiliary winding of the welding inductor wound on the iron core and connected to the main winding such that the main winding and the auxiliary winding supply ampere-turns in the same direction when passed by a current, said smoothing circuit connected in parallel to the main winding, the electrode and the work, and
   a charging rectifier means connected to the auxiliary winding and in series with the capacitor means, said charging rectifier comprising a charging circuit with the capacitor means and connected to the alternating current supply, said charging rectifier means arranged to block the passage of the discharge current of the capacitor means.

2. Arc welding power supply as set forth in claim 1 wherein the said charging circuit is connected between the two terminals and a rectifier means is connected in series with the electrode, the work and the main winding and in parallel to the circuit made out by the charging rectifier means and the auxiliary winding, said rectifier means being so poled as to block the flow of the discharge current of the capacitor means.

3. Arc welding power supply as set forth in claim 1 wherein the number of turns of the auxiliary winding is 1.5 times to 5 times the number of the turns of the main winding.

4. Arc welding power supply as set forth in claim 1 wherein the auxiliary winding is provided with a plurality of taps for adjusting its number of turns and the charging rectifier means and the capacitor means are connected to the same tap.

5. Arc welding power supply as set forth in claim 1 wherein the auxiliary winding is provided with a plurality of taps for adjusting its number of turns and the charging rectifier means and the capacitor means are connected to different taps.

6. Arc welding power supply as set forth in claim 1 wherein the main winding and the auxiliary winding are wound on the iron core beside one another.

7. Arc welding power supply as set forth in claim 1 wherein the iron core is I-shaped.

8. Arc welding power supply comprising:
   two conductors connected to a single-phase current supply having two terminals,
   a welding electrode,
   a work,
   a half-wave welding rectifier means,
   a welding inductor provided with an iron core, an auxiliary winding and a main winding, means connecting in series said terminals, said half-wave rectifier means, said main winding, said welding electrode and said work,
   a charging circuit comprising a charging rectifier means and a capacitor means in series, said charging circuit connected across said two terminals,
   an inductor, the winding of said inductor comprising the auxiliary winding wound on said iron core and connected to the main winding such that the main winding and the auxiliary winding supply ampere-turns in the same direction when passed by a current, said auxiliary winding connected between the main winding and the junction of the charging rectifier means and the capacitor means.

* * * * *